(12) United States Patent
Forchino

(10) Patent No.: US 6,240,860 B1
(45) Date of Patent: Jun. 5, 2001

(54) MOUNTING SYSTEM FOR SECURING PLANTING UNITS IN PLANTING MACHINES

(76) Inventor: Elvio Antonio Forchino, Paso de los Andes 967, Las Rosas-Santa Fé(AR), 2520

( * ) Notice: Subject to any disclaimer, the term of this patent is extended or adjusted under 35 U.S.C. 154(b) by 0 days.

(21) Appl. No.: 09/425,983

(22) Filed: Oct. 25, 1999

(51) Int. Cl.[7] ................................................. A01C 5/00
(52) U.S. Cl. .................. 111/52; 111/69; 403/196; 403/197; 403/260; 403/384; 403/408.1; 172/691; 172/694; 172/739; 172/741; 172/763
(58) Field of Search ................... 111/52, 69, 200; 172/763, 762, 773, 775, 776, 684.5, 691, 694, 697, 739, 740, 741; 403/87, 110, 196, 197, 256, 258, 259, 260, 384, 407.1, 408.1

(56) References Cited

U.S. PATENT DOCUMENTS

| 4,377,979 | * | 3/1983 | Peterson et al. | 111/52 |
| 4,569,296 | * | 2/1986 | Miller et al. | 111/52 X |
| 5,632,344 | * | 5/1997 | Fix | 111/52 X |

* cited by examiner

*Primary Examiner*—Christopher J. Novosad
(74) *Attorney, Agent, or Firm*—Jacobson, Price, Holman & Stern, PLLC

(57) ABSTRACT

A mounting system for securing planting units in planting machines, each unit including at least a portion removably secured to a carrier beam, the system allowing to quickly and simply change the distance between working units in order to adapt the machine to a better use thereof the beam having at least one slot extending along the beam and receiving a bolt connected to a curved plate bearing against a rear face of the beam, and to the beam, the bolt passing through the slot of the beam.

7 Claims, 2 Drawing Sheets

MOUNTING SYSTEM FOR SECURING PLANTING UNITS IN PLANTING MACHINES

BACKGROUND OF THE INVENTION

1. Field of the Invention

The present invention relates to a new arrangement for mounting and securing working units such as sowing or planting machines, wherein each working unit has at least one portion to be removably secured to a carrier beam of a frame of the machine and, more particularly, the invention relates to a new beam and coupling means for mounting the sowing or planting units in a planting machine whereby the units may be moved from one position to another position, whereby a spacing distance between said units may be quickly and simply changed.

2. Description of the Prior Art

As it is well known in the agricultural field, when using sower or planting machines comprising a plurality of sower or planting units, the distance between the units may need to be changed in order to better make use of the ground according to the type of products to be cultivated, the size of seeds to be planted, etc. With the advance of research related to plowing techniques, several parameters have been adjusted in order to attain a better use of the ground area to be cultivated and a higher productivity of the soil. Among these parameters, the distance between the sowing furrows have to be changed into a wide range of metric values, this attaining a substantial increase in the yield of cultivated soils.

Generally, in conventional sower or planting machines, the sowing bodies or units are mounted in a cross bar or beam of a frame of the machine by means of clamps that are tightly secured to said beam by means of bolts or screws. Consequently, every time that is necessary to vary the distance between furrows, and therefore between sowing or planting units, the clamps have to be released by untightening the bolts in order to thereafter move each working unit up to the desired position relative to adjacent units. This operation requires the participation of two or more workers in order to keep the clamp positioned in such a way to prevent the same from blocking the movement of the planting or sowing units. Even so, the operation is troublesome and takes a considerable time until the planting units are suitably located and spaced apart to each other by the desired distance.

Seeking for a solution to the above drawbacks, some agriculture machines have been developed embodying various mechanisms that allow to change the distance between the working units, for example a well known machine including a plow for plowing multiple furrows that allows continuous adjustment of plowshare mountings between a maximum and a minimum desired distances between furrows. However, this known machine makes use of a complex mechanism by means of which changing of the distance between furrows is determined by changing the angle or slope relative to a rectangular tube in which the working units are coupled relative to the direction of traveling of the plow. Said plowshare mountings also have to be rotated at the same time relative to the rotation axis on said tube and depending of the tube inclination. Although this arrangement would solve, at least partially, the disclosed problem, it is of such a complexity that, besides involving a substantially high cost, makes this machine extremely heavy and requires intensive maintenance work. Furthermore, when simultaneously moving all the above working units to change the distance between said units this distance modification is constant for all the units thus preventing from obtaining other combinations that might be necessary in the practice.

SUMMARY OF THE INVENTION

It is therefore an object of the invention to provide an agricultural machine with a beam and coupling means to allow to change the distance between sowing units in an extremely simple and rapid way, to such an extent that only one worker can carry out the desired changes without difficulties.

It is also another object of the present invention to provide improve mounting means that can be applied to conventional machines, such as those above mentioned in connection to the prior art, with a minimum cost of adaptation since, as it will become apparent from the following description the number of parts involved in the improvements is minimum, and the realization and mounting operation is very simple and quick.

It is a further object of the present invention to provide a new arrangement for mounting and affixing, in a releasably way, working units in desired positions along a carrier beam in frame of a working machine, said arrangement comprising a beam having at least a longitudinal slot passing therethrough and extending from a front face to a rear face of the beam, said portion of the working units being connected to the beam through coupling means comprising at least one coupling plate abutting against said rear face of the beam and the plate being secured to said portion of the respective working unit, at least one securing bolt passing through said plate, which bolt passes in turn through said longitudinal slot from the rear face to the front face of said beam thus coupling and tightening the plate against the beam, thus securing to associated working unit to the beam.

It is still another object of the present invention to provide a mounting system for mounting and affixing working units to a working machine, the units being of the type comprising planting units in planting machines, each working unit having at least one connecting portion removably secured to a carrier beam having at least one longitudinal slot passing through the beam and extending from a front face to a rear face of the beam, said connecting portion of the working unit being connected to the beam through coupling means comprising a coupling plate and engaging secured to said portion of the respective working unit said rear face of the beam, at least one securing means passing through said plate and through said longitudinal slot, whereby the working unit is firmly and removably secured to the beam by the securing means and the coupling plate.

DESCRIPTION OF THE DRAWINGS

For a better clarity and understanding of the object of the present invention, the present invention has been illustrated in several figures, wherein the present invention has been shown in one of the preferred embodiments, by way of example one, wherein.

DETAILED DESCRIPTION OF THE PREFERRED EMBODIMENTS

Figure 1:
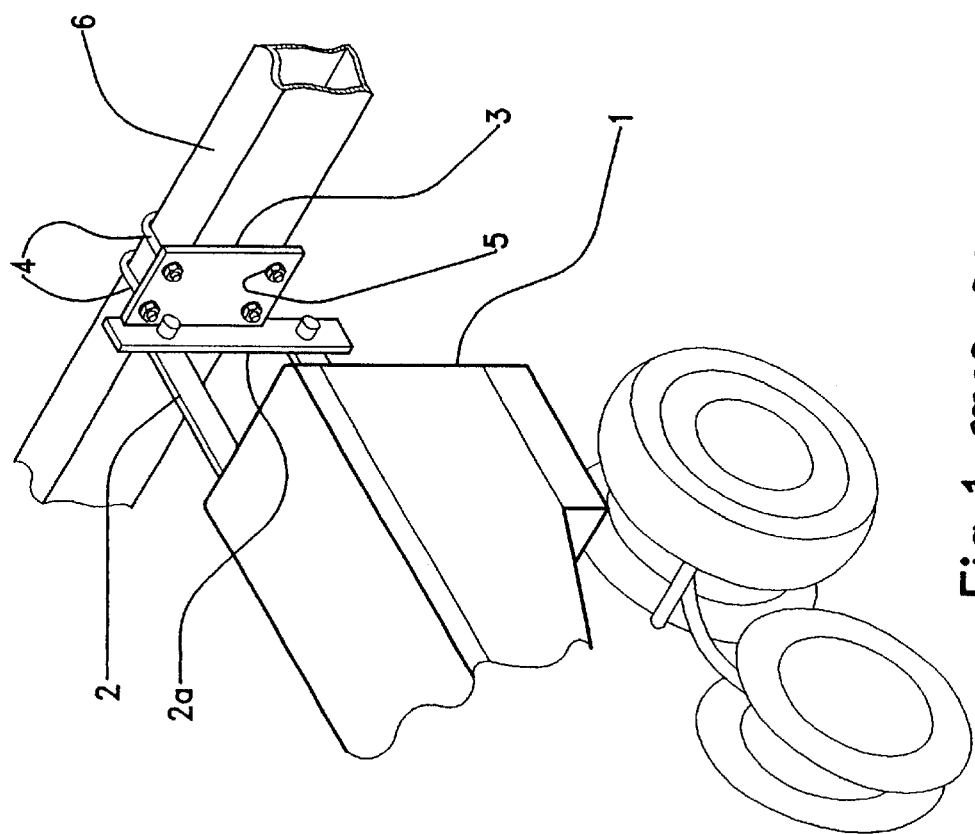
FIG. 1 shows a perspective and partially sectional view of a prior art planting unit of a sower or planting machine, with a unit coupled to a conventional beam through a conventional coupling means.

Making reference first to FIG. 1 a conventional sowing or planting unit 1 is shown. The unit has a securing portion including articulated arms 2 and 2a forming part of a deformable parallelogram partially illustrated in this figure, with arm 2a being secured by welding, for example, to a coupling plate 3 to which clamps 4 are tightened through nuts 5 for affixing sowing unit 1 to a crossbeam 6 that is part of a frame (not shown) of a working machine (not shown), a planting machine, for example.

In order to vary the distance between working units 1, nuts 5 have to be loosened in order to release the fitting clamps 4 from beam 6. Under these circumstances, planting unit 1 is attempted to be moved sideways, but the friction exerted between clamps 4 and beam 6 because of a random and/or oscillatoring movement of clamps 4 pivoting in plate 3 makes difficult to move unit 1 along beam 6. An alternative solution for this drawback would be entirely remove said clamp 4, but clearly this would greatly increase the time of operation, which is undesirable.

Figure 2:
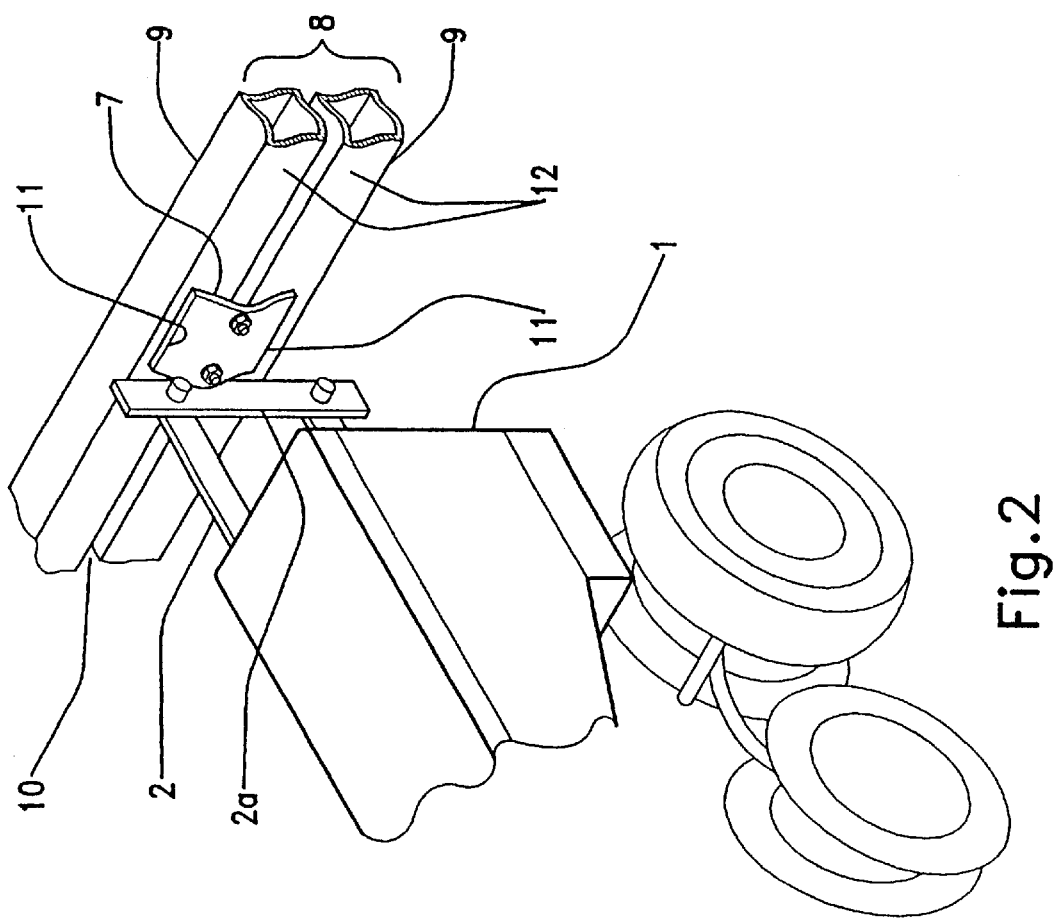
FIG. 2 shows a perspective and partially sectional view of a sowing or planting unit mounted onto a carrier of a beam through working machine coupling means in accordance with the present invention.

FIG. 2 shows a working unit and a carrier beam or cross beam according to the invention wherein the unit is mostly like the unit having a portion releasably connected to the beam and including a deformable parallelogram comprising articulated arms 2 and 2a, but plate 3 has been replaced, according to the invention, by a plate 7 and conventional beam 6 has been replaced, also in accordance to the invention by a beam or dual beam 8.

Beam 8 may be a dual beam comprising two parallel bars 9 spaced apart by a gap that defines at least one longitudinal slot 10. Bars 9 are joined to each other by means of crosspieces (not shown), arranged at several locations along bars 9, thus forming the structure of dual beam 8. Plate 7 is secured to arm 2a, e.g. by means of conventional weldings. As it is shown, plate 7 has a curved shape, forming a concavity facing a rear face 12 of beam 8 and defining edges 11 for bearing against face 12. The mounting and affixing of sowing or planting unit 1 onto beam 8 is completed with securing means comprising at least one bolt, preferably two securing bolts passing through plate 7, slot 10 and other associated elements, as it is shown in FIG. 3.

Figure 3:
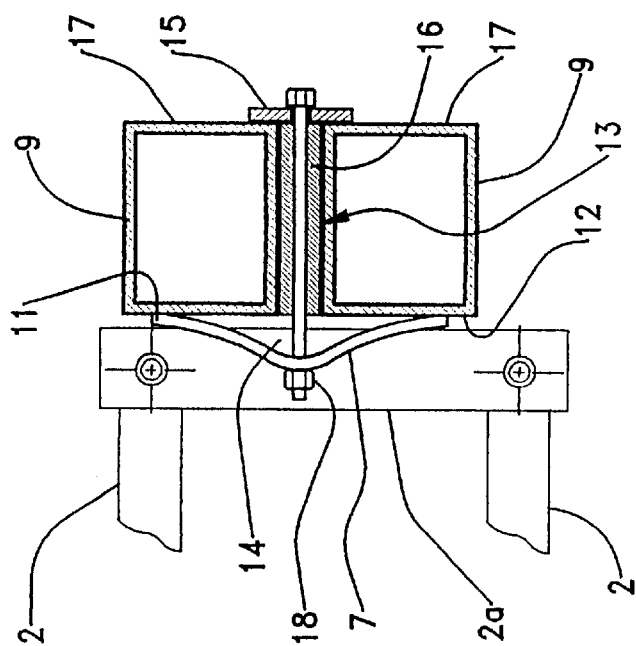
FIG. 3 shows a side elevational and partially sectional view of the coupling means of the present invention, also partially showing the articulated arms, or deformable parallelogram, of a sowing or planting unit.

FIG. 3 shows the coupling means according to the invention and comprising at least one securing bolt 14, which can be tightened by means of a nut 18, passing through coupling plate 7 and a front plate 15, which plate 15 forms a sort of dual washer, i.e., a plate with one hole for each one of two bolts 14, as it is used in a preferred embodiment of the invention. As it is shown, bolt 14 passes through a tube portion or a roller 16 extending between rear face 12 and front face 17 of beam 8, i.e., along the width of slot 10. Thank to the coupling means of the invention units 1 can be easily moved at both sides along beam 8 in a simple and quick operation. Actually, during the operation of the sower or planting machine, bolts 14 have to be firmly tightened in such a way that the pressure exerted by plates 7 and 15 in faces 12 and 17 of dual beam bars 9 keep each sowing unit 1 secured in a given working position. When it is necessary to modify the spacing between said units, bolts 14, associated to each unit 1, are loosened thus releasing the tightening pressure of plates 7 and 15 against faces 12 and 13 and consequently rollers 16 can roll on an inside face 13 of slot 10, thus allowing each unit 1 to freely move along longitudinal slot 10. Minimum work is thus necessary for planting units 1 because, in contrast to the arrangements used in conventional machines where high friction forces block and bar the sliding movement between clamps 4 and beam 6, such friction forces are avoided as long as the prior art friction faces are entirely excluded.

Figure 4:
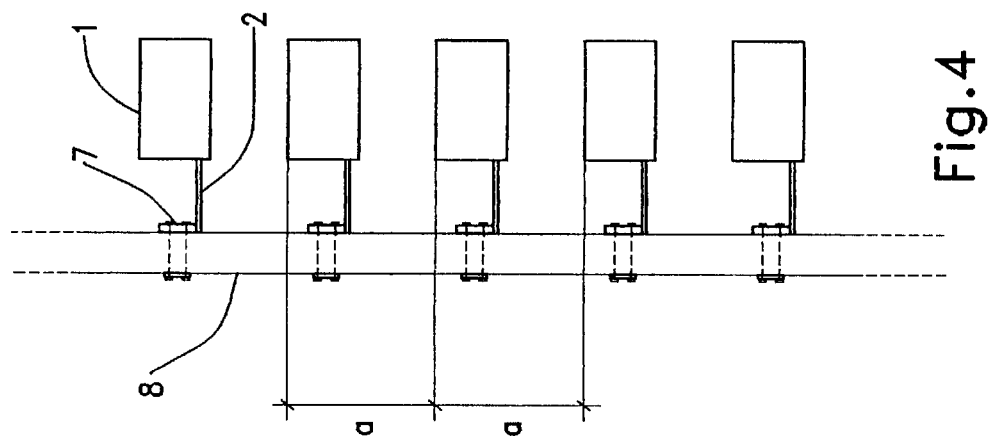
FIG. 4 schematically shows a top plan view of several sowing or planting units coupled to a beam, with reference letter "a" indicating the distance between adjacent sowing or planting units to be varied according to the invention.

As it is shown in FIG. 4, several units 4 may be arranged along beam and spaced apart by a predetermined distance "a" depending on the kind of seeds that are to be planted wherein the width of the corresponding furrow will be determined based on the seeds.

The distances "a" may be easily and quickly varied according to the invention, as it was above disclosed.

While the above description and illustrations relate to a preferred embodiment of the present invention, said beam 8 can also be a single bar of substantially square cross section, the front and rear faces 12 and 17 including successive longitudinal slots. Therefore, slot 10 partially illustrated in the drawing should be interpreted as only one continuous slot that is part of a plurality of aligned slots in only one beam or a dual beam. Moreover, in other embodiments of the present invention, said roller 16 can be replaced, e.g., by other type of bearings such as roller bearings.

While preferred embodiments of the present invention have been illustrated and described, it will be obvious to those skilled in the art that various changes and modifications may be made therein without departing from the scope of the invention as defined in the appended claims.

What is claimed is:

1. A mounting system for mounting and affixing working units to a working machine, the units being of the type comprising planting units in planting machines, each working unit having at least one connecting portion removably secured to a carrier beam having at least one longitudinal slot passing through the beam and extending from a front face to a rear face of the beam, said connecting portion of the working unit being connected to the beam through coupling means comprising a coupling plate secured to said portion of the respective working unit and engaging said rear face of the beam, at least one securing means passing through said plate and through said longitudinal slot, whereby the working unit is firmly and removably secured to the beam by the securing means and the coupling plate.

2. The system of claim 1, wherein the beam is a dual beam comprising two parallel bars vertically spaced apart by a predetermined distance, the spacing between said bars defining said longitudinal slot, said bars being rigidly joined with each other through cross pieces arranged lengthwise along said bars.

3. The system of claim 1, wherein the beam is a bar having a substantially square cross section including successive longitudinal slots extending between said front and rear faces of said bar.

4. The system of claim 1, wherein the coupling plate has an curved cross-section defining a concavity and plate edges bearing against the rear face of the beam.

5. The system of claim 1, wherein said securing means passes through a tube portion extending inside said slot and, defining a roller extending between said front face and said rear face of said beam.

6. The system of claim 1, wherein the securing means comprises a bolt.

7. The system of claim 6, wherein said securing means comprise two securing bolts, and the coupling means further includes a front plate bearing on the front face of the beam, said front plate having two holes through which said bolts pass and are tightened by means of respective nuts.

* * * * *